Feb. 14, 1933. K. WIEGAND ET AL 1,897,459
TERMINAL FOR ELECTRIC DEVICES
Filed Feb. 14, 1930

INVENTORS
Kurt Wiegand
Julius Habel
BY Charles A. Tullar
THEIR ATTORNEY

Patented Feb. 14, 1933

1,897,459

UNITED STATES PATENT OFFICE

KURT WIEGAND, OF BERLIN, AND JULIUS HABEL, OF BERLIN-TEMPELHOF, GERMANY, ASSIGNORS TO GENERAL ELECTRIC COMPANY, A CORPORATION OF NEW YORK

TERMINAL FOR ELECTRIC DEVICES

Application filed February 14, 1930, Serial No. 428,530, and in Germany July 9, 1929.

The present invention relates to electric discharge devices generally and more particularly the invention relates to electrical terminal parts for such devices.

The object of the invention is to furnish an electrical terminal member for a gaseous discharge device said member possessing great safety, simplicity and compactness.

In accordance with this object the invention consists of a socket made of insulation material having an electrical conducting contact member screwed therein. The exposed parts of said conducting member are covered and protected by a cap made of insulation material which has an opening therein adapted to accommodate an electrical feed cable attached to said conducting member.

Figure 1:
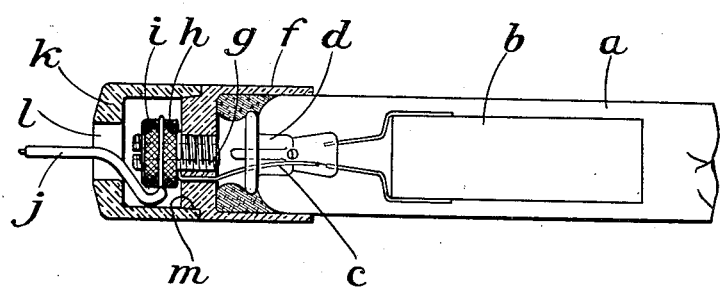
Figure 2:
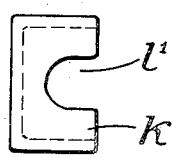

In the drawing accompanying and forming part of this specification two embodiments of the invention are shown for purposes of illustration in which Fig. 1 is a side view of the invention with the new and novel socket shown in cross section, and Fig. 2 is a side view of an alternative embodiment of the protecting cap of said socket.

Referring to Fig. 1 of the drawing, "*a*" is an electric discharge device, "*b*" one of the electrodes of said device and "*c*" is a current lead sealed into stem "*d*" of the discharge device "*a*". Said lead "*c*" passes through socket "*f*" and is wound around bolt "*g*" which is screwed into said socket "*f*". Two nuts "*h*" and "*i*" are screwed on to said bolt "*g*" clamping the end of cable "*j*" between them and clamping current lead "*c*" between the nut "*h*" and the wall of socket "*f*".

Cap "*k*" made of insulation material protects the current conducting parts "*g*", "*h*", "*i*" against any accidental contacts which may prove harmful to the successful operation of the discharge device. Said cap "*k*" is adapted to fit snugly on the rim "*m*" of the socket "*f*" so that it is kept in place by friction and may be easily attached and removed from said socket. It will be understood, however, that any suitable means may be used to attach said cap "*k*" to said socket "*f*". Cap "*k*" may also be attached directly to the discharge device if no socket is provided.

Referring to Fig. 2, the cap shown has an opening in the side wall thereof adapted to accommodate an electrical feeding cable situated at right angles to the longitudinal axis of the discharge device.

While I have shown and described and have pointed out in the annexed claims certain new and novel features of the invention it will be understood that various omissions and changes may be made in the details and parts thereof without departing from the broad spirit and scope of the invention.

What we claim as new and desire to secure by Letters Patent of the United States, is:

1. In combination an electric discharge device, a base therefor, said base being permanently attached to said device, a cap for said base adapted to cover the conducting parts thereof and to accommodate a current lead connected to said parts, said cap being of the same outside diameter as said base.

2. In combination an electric discharge device, a base therefor, said base being permanently attached to said device, a cap of insulation material for said base adapted to cover the exposed conducting parts thereof and to accommodate a current lead connected to said parts, said cap being of the same outside diameter as said base.

In witness whereof, we have hereunto set our hands this 29th day of January, 1930.

KURT WIEGAND.
JULIUS HABEL.